United States Patent
Saito

(10) Patent No.: US 7,197,020 B2
(45) Date of Patent: Mar. 27, 2007

(54) RADIO COMMUNICATION SYSTEM AND BASE STATION

(75) Inventor: Naritoshi Saito, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1085 days.

(21) Appl. No.: 10/106,392

(22) Filed: Mar. 27, 2002

(65) Prior Publication Data

US 2002/0142778 A1 Oct. 3, 2002

(30) Foreign Application Priority Data

Mar. 28, 2001 (JP) ............................. 2001-093864

(51) Int. Cl.
*H04B 7/216* (2006.01)
*H04Q 7/38* (2006.01)

(52) U.S. Cl. ..................... 370/335; 370/342; 370/441; 455/450

(58) Field of Classification Search ..................... None
See application file for complete search history.

(56) References Cited

U.S. PATENT DOCUMENTS

| | | | |
|---|---|---|---|
| 5,883,899 A * | 3/1999 | Dahlman et al. ........... | 370/468 |
| 6,665,281 B1 * | 12/2003 | Kim .......................... | 370/331 |
| 6,810,019 B2 * | 10/2004 | Steudle ...................... | 370/252 |
| 6,885,648 B2 * | 4/2005 | Yano et al. ................. | 370/335 |
| 2001/0008521 A1 * | 7/2001 | Virtanen ..................... | 370/331 |
| 2002/0006119 A1 * | 1/2002 | Steudle ....................... | 370/329 |

FOREIGN PATENT DOCUMENTS

| | | |
|---|---|---|
| EP | 1 137 203 | 9/2001 |
| WO | WO 99/56410 | 11/1999 |
| WO | WO 01/52585 | 7/2001 |

OTHER PUBLICATIONS

ETSI TS 125 215 V3.5.0 (Dec. 2000), 'Online !, Retrieved from the Internet : <URL :http ://WEBAPP. ETSI. ORG/exchangefolder/ts_125215v030500p. pdf>, pp. 1-19, XP-002247727, "Universal Mobile Telecommunications System (UMTS); Physical Layer—Measurements (FDD) (3GPP TS 25.215 Version 3.5.0 Release 1999)", Jul. 15, 2003.

* cited by examiner

*Primary Examiner*—Seema S. Rao
*Assistant Examiner*—Robert C. Scheibel, Jr.
(74) *Attorney, Agent, or Firm*—Oblon, Spivak, McClelland, Maier & Neustadt, P.C.

(57) ABSTRACT

A radio communication system in which information of a unit length is constituted with a plurality of frames as a set and the information is transmitted/received between a base station and a mobile station. A control section of the base station decides, during a telephone communications, performed between the base station and the mobile station, when an instruction to switch the frequency to a second frequency is received from an upper order network via a transmission/reception section, a time interval for the telephone communication using the second frequency so as not to stride over a boundary of frame sets adjacent to each other.

20 Claims, 6 Drawing Sheets

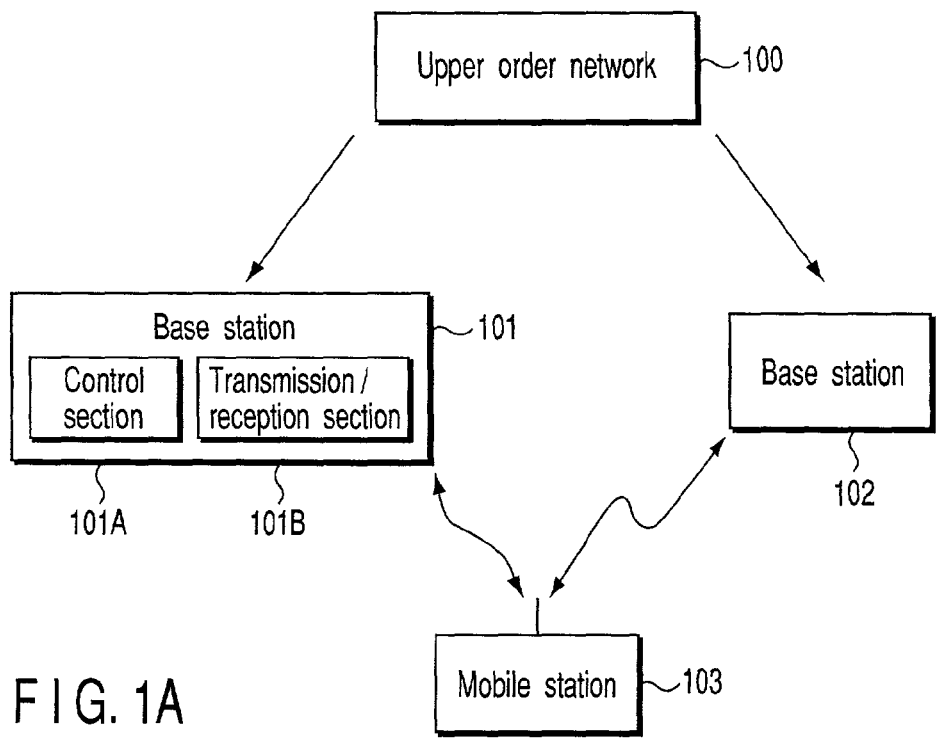
FIG. 1A
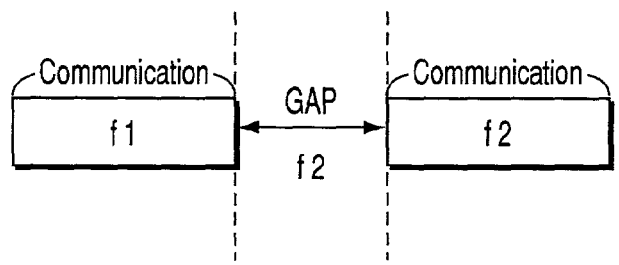
FIG. 1B
| P-CCPCH | SFN = 16 | | SFN = 18 | | SFN = 20 | |
|---|---|---|---|---|---|---|
| | Frame 16 | Frame 17 | Frame 18 | Frame 19 | Frame 20 | Frame 21 |
FIG. 2

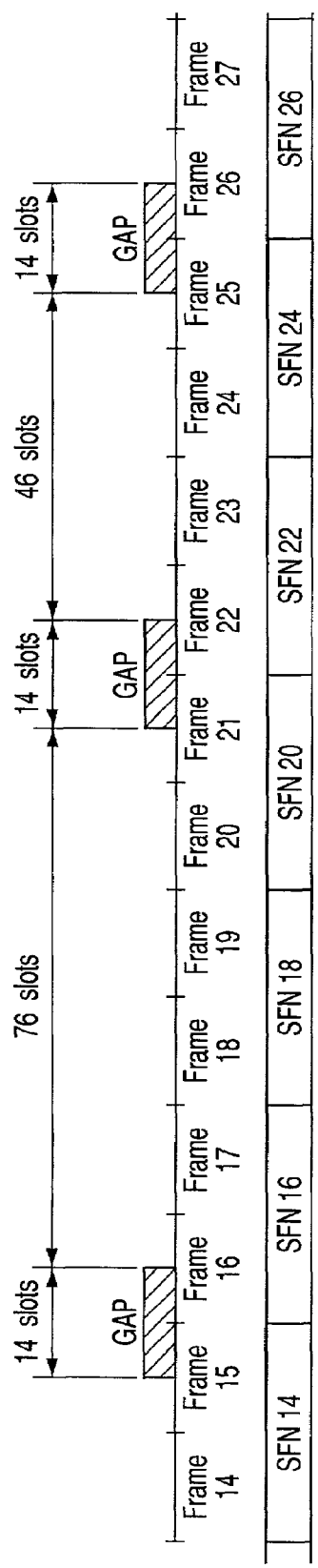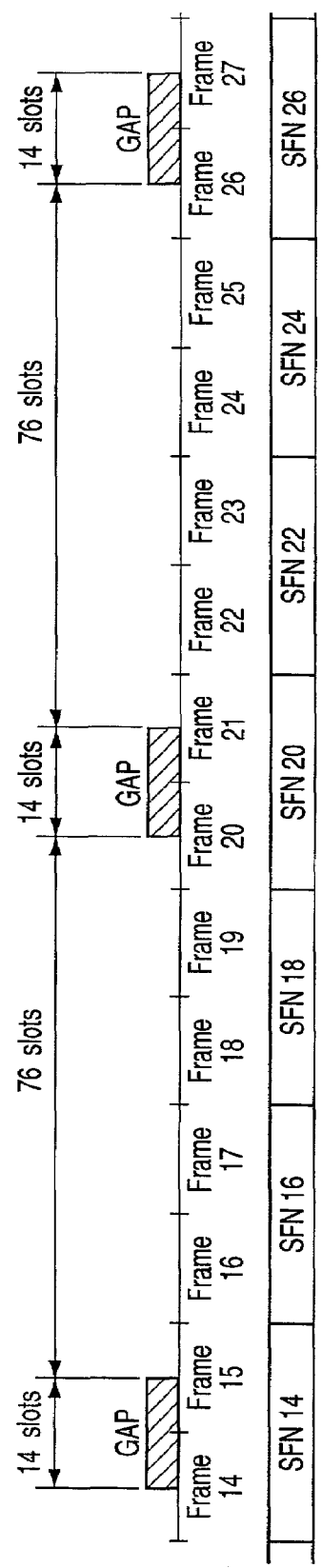
FIG. 6
FIG. 7

Synthesizer switched
(from timing control system)

RADIO COMMUNICATION SYSTEM AND BASE STATION

CROSS-REFERENCE TO RELATED APPLICATIONS

This application is based upon and claims the benefit of priority from the prior Japanese Patent Application No. 2001-093864, filed Mar. 28, 2001, the entire contents of which are incorporated herein by reference.

BACKGROUND OF THE INVENTION

1. Field of the Invention

For example, in a communication system such an automobile or portable telephone system and a radio LAN, a CDMA (Code Division Multiple Access) communication using a spread spectrum system is practiced particularly.

2. Description of the Related Art

In the case of a third generation W (wideband)-CDMA system, BCH (Broadcast Channel) information in a transport channel is transmitted using a P-CCPCH (Primary Common Control Physical Channel) in a physical channel by a 3GPP standard. It is considered that the P-CCPCH forms one piece of CRC (Cyclic Redundancy Check) information using P-CCPCH data of two frames for information transmission efficiency.

A GAP (time interval) of several slots during reception of a base station signal currently in the midst of telephone communication is provided, and a compressed Mode, which is a function to search a base station having a different frequency f2 from a base station frequency f1 by using this GAP, has been proposed.

In the case of the third generation W-CDMA system, since there is no regulation for the optimum position in the base station signal to provide the GAP at the compressed mode time, there occurred a problem that, when the BCH information is received via the P-CCPCH, reception efficiency is deteriorated depending on the GAP position to be decided.

Since the GAP position is decided without taking into consideration the correspondence with the BCH information block, there occurs a problem that a portion of the same information block is always dropped out due to influence of the compressed mode. Because of the dropout of this same information block, necessary terminal information cannot be obtained depending on the situation, and there arises a trouble that a serious error on the system develops in a position registration, and the telephone communication is cut off half-way.

BRIEF SUMMARY OF THE INVENTION

Accordingly, an object of the present invention is to provide a communication system and a base station, which can control a dropout of information at a compressed mode time to a minimum.

In order to achieve the above described object, according to a first aspect of the present invention, there is provided a radio communication system in which information of a unit length is constituted with a plurality of frames as a set and the information is transmitted/received between a base station and a mobile station, wherein the base station comprises: a transmission/reception section; and a control section which, during a telephone communication is performed between the base station and the mobile station using a first frequency, when an instruction to switch the frequency to a second frequency is received from an upper order network via the transmission/reception section decides a time interval for the telephone communication using the second frequency so as not to stride over a boundary of frame sets adjacent to each other.

Further, according to a second aspect of the present invention, there is provided a radio communication system in which information of a unit length is constituted with a plurality of frames as a set and the information is transmitted/received between a base station and a mobile station, wherein the base station comprises: a control section which, during a telephone communication is performed between the base station and the mobile station using a first frequency, when an instruction is received from an upper order network to switch the frequency to a second frequency, decides a time interval for the telephone communication using the second frequency so as not to stride over a boundary of frame sets adjacent to each other; and a transmitting section which transmits a base station signal including information necessary to form the decided time interval, and the mobile station forms the time interval at a predetermined position of the base station signal in the midst of reception on the basis of the information transmitted from the transmission section.

Further, according to a third aspect of the present invention, there is provided a base station in which information of a unit length is constituted with a plurality of frames as a set and the information is transmitted/received between itself and a mobile station, comprising: a control section which, during a telephone communication is performed between the base station and the mobile station using a first frequency, when the telephone communication is switched to the communication using a second frequency decides a time interval for the telephone communication using the second frequency so as not to stride over a boundary of frame sets adjacent to each other; and a transmission/reception section which transmits information necessary to form the time interval to the mobile station.

Further, according to a fourth aspect of the present invention, there is provided a radio communication method in which information of a unit length is constituted with a plurality of frames as a set and the information is transmitted/received between a base station and a mobile station, comprising: a step of receiving, during a telephone communication is performed between the base station and the mobile station using a first frequency, an instruction from an upper order network to switch the frequency to a second frequency; a step of deciding a time interval for the telephone communication using the second frequency so as not to stride over a boundary of frame sets adjacent to each other; a step of transmitting a base station signal including information necessary to form the decided time interval to the mobile station; and a step of forming the time interval at a predetermined position of the base station signal in the midst of reception on the basis of the transmitted information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIGS. 1A and 1B are diagrams showing a schematic constitution of a W-CDMA system;

FIG. 2 shows a structural example of a P-CCPCH;

FIG. 6 shows a state in which a plurality of GAPs have been formed by a conventional method described in FIG. 3;

FIG. 7 shows a state in which a plurality of GAPs have been formed by a method of the present invention;

DETAILED DESCRIPTION OF THE INVENTION

FIGS. 1A and 1B are diagrams showing a schematic constitution of a W-SDMA system. For example, during a telephone communication, performed between a base station 101 and a mobile station 103 using a frequency f1, when the base station 101 receives an instruction from an upper order network via a transmission/reception portion 101B to set up a compressed mode, a control portion 101A decides a GAP position for searching a frequency f2 so as not to stride over a boundary of frame sets adjacent to each other on the basis of a parameter such as TGSN, TGL1, TGD and the like described in 6.1.2 of 25.215 of the 3GPP standard.

When the base station 101 transmits to the mobile station 103 information necessary to form a GAP such as GAP position information, GAP length information and GAP repetition information, the mobile station 103 forms a GAP having a predetermined length at a predetermined position of the base station signal in the midst of reception based on this information. By utilizing this GAP, the frequency f2 to be searched is decided by the mobile station side. After that, the base station 102 starts the telephone communication with the mobile station 103 by utilizing the base station signal of the frequency f2.

Note that the base station 101 receives in advance an instruction regarding the compressed mode from the upper order network 100 and may send information necessary for the GAP formation to the mobile station 103 at a predetermined timing.

In the present embodiment, the same BCH information is not always dropped out by preventing the GAP position at the compressed mode from coming to the same frame position.

The GAP position is decided by such a method so that the dropout of the BCH information which occurs at the compressed processing time can be reduced by about 50% at the worst time. From among the BCH information blocks to be transmitted, the block which is dropped out due to the compressed processing can be systematically decided. Therefore, it is possible to reduce the systematic trouble due to the dropout of the BCH information at the terminal side in the compressed mode.

Figure 14:
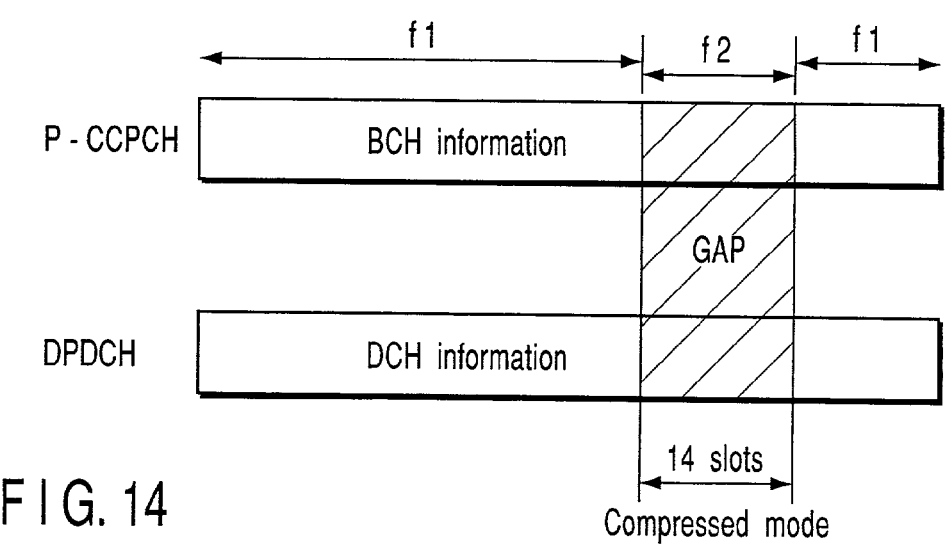
FIG. 14 shows a relationship between a transport channel and a physical channel.

FIG. 14 shows a relationship between a transport channel and a physical channel. The BCH information of the transport channel corresponds to a P-CCPCH of the physical channel, and DCH (Dedicated Channel) information (such as user information) of the transport channel corresponds to a DPDCH (Dedicated Physical Data Channel) of the physical channel.

Assuming that the GAP for searching the signal of another frequency (here, f2) different from the frequency f1 currently used in the midst of telephone communication is, for example, formed by 14 slots as shown in FIG. 14, the communication with the base station up to now is cut off due to interruption of the P-CCPCH, and the information which includes the BCH information also is dropped out due to interruption of the P-CCPCH which carries the BCH information.

Figure 3:
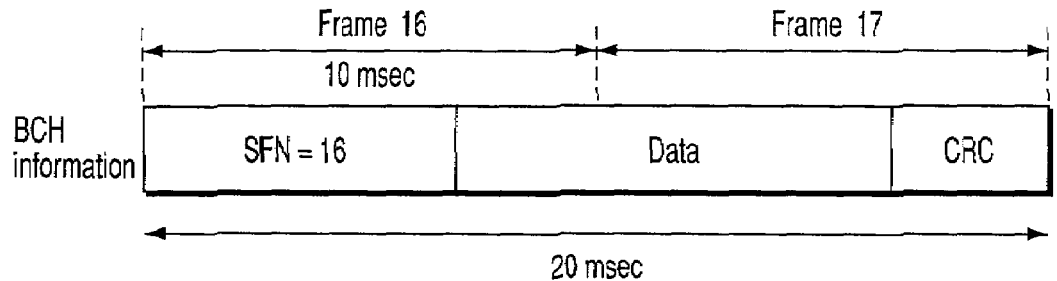
FIG. 3 shows an internal constitution of BCH information.

FIG. 2 shows a constitutional example of the P-CCPCH. In this example, two frames (for example, frame 16 and frame 17) constitute one piece of the BCH information. FIG. 3 shows an internal constitution of the BCH information. Since one piece of the BCH information is constituted with two frames as a set as described above, for example, when the communication environment is deteriorated in frame 17 so that the communication becomes difficult, it is not possible to determine whether or not the frame is normal using CRC information contained in frame 17, and therefore, there occurs a phenomenon that the information of frame 16 cannot be demodulated.

Figure 4:
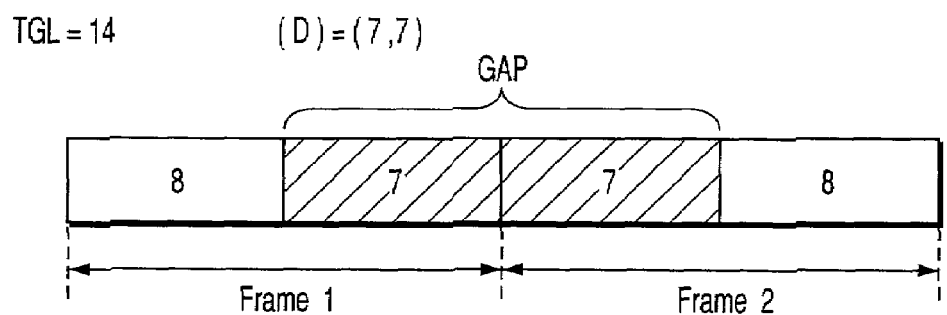
FIG. 4 shows one example of the formation of a GAP at a compressed mode time.
Figure 5:
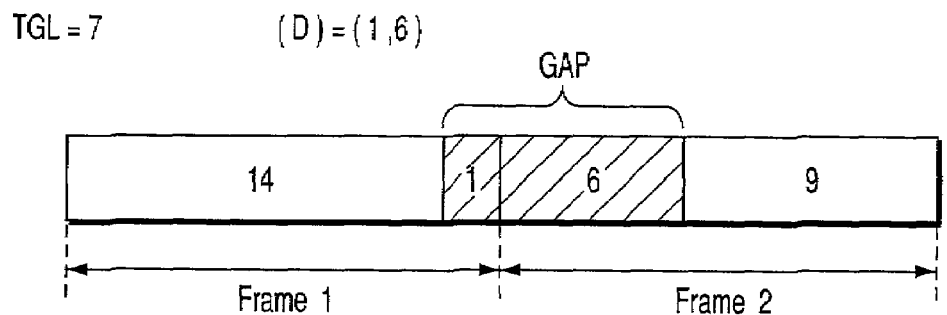
FIG. 5 shows another example of the formation of the GAP at the compressed mode time.

FIGS. 4 and 5 explain a specific example of the GAP formation at the time of the compressed mode determined by the 3GPP standard in the W-CDMA system. According to the 3GPP standard, one frame is 10 ms and is constituted by 15 slots. FIG. 4 is an example of the GAP having 14 slots, which is constituted by 7 slots of the rear portion of frame 1 and 7 slots of the front portion of frame 2. FIG. 5 shows another example of the GAP formation. In this example also, the GAP formation spends two frames, which is an example of the GAP comprising 7 slots using 1 slot of the rear potion of frame 1 and 6 slots of the front portion of frame 2. In either case, the GAP is formed striding over a boundary of a set of two frames.

Hereinafter, in order to simplify the description, the GAP formation in the conventional example and the present embodiment will be described by using the GAP comprising 14 slots described in FIG. 4.

FIG. 6 shows a state in which a plurality of GAPs have been formed by the method described in FIG. 4. The position of the GAP is decided without taking into consideration the P-CCPCH comprising sets of the BCH information. In the example of FIG. 6, while a GAP is formed between frame 15 and frame 16, the BCH information is constituted with frame 14 and frame 15 as a set and the BCH information is constituted with frame 16 and frame 17 as a set. As a result, the BCH information of four frames, i.e., from frame 14 to frame 17, drops out due to one piece of the GAP.

On the other hand, FIG. 7 shows a state in which a plurality of GAPs have been formed by the method of the present embodiment. As shown in FIG. 7, in the present embodiment, a GAP position is formed so as not to stride over a boundary of a set of two frames, each of which constitutes one piece of the BCH information. Therefore, two frames only of frame 14 and frame 15 become useless due to the formation of the GAP position.

That is, in the conventional example shown in FIG. 6, 12 frames among 14 frames from frame 14 to frame 27 are dropped out due to the formation of three GAPs so that no communication is made possible, and received information data of only two frames can be obtained (frame 18 and frame 19). In contrast, according to the GAP forming method according to the present invention shown in FIG. 7, the information of 8 frames (from frame 16 to frame 19 and from frame 22 to frame 25) can be received. Therefore, reception efficiency becomes four times better as that of the conventional example.

Figure 8:
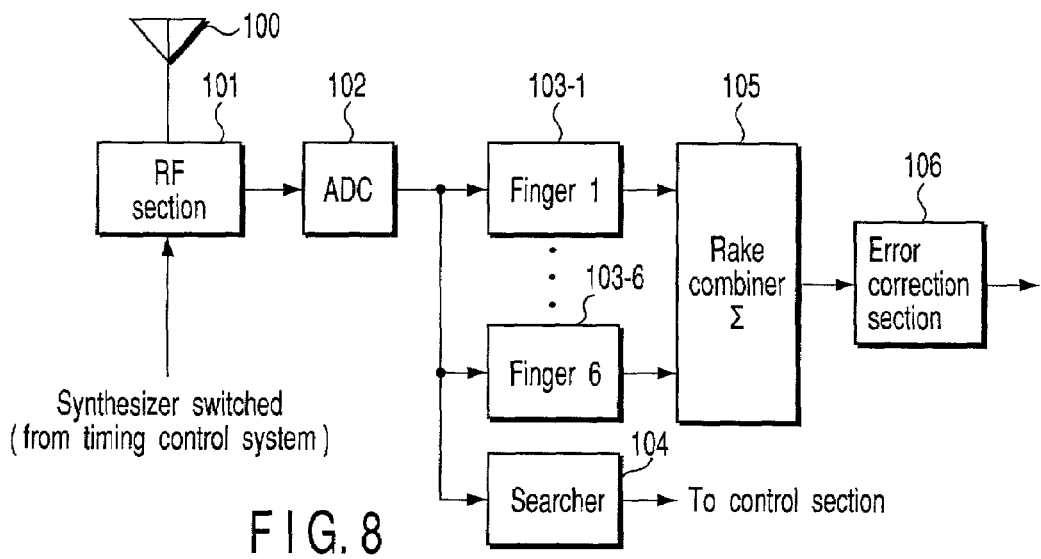
FIG. 8 is a block diagram showing a schematic constitution of a mobile terminal to which a communication system of the present invention is applied.

The operation of the radio communication system in the compressed mode will be described below. FIG. 8 is a block diagram showing a schematic constitution of a mobile station to which the radio communication system of the present invention is applied. The mobile station is constituted by an antenna 100, an RF section 101, an analog/digital converter (ADC) 102, a plurality of fingers 103-1 to 103-6, a searcher 104, a RAKE combiner 105 and an error correction section 106.

Figure 9:
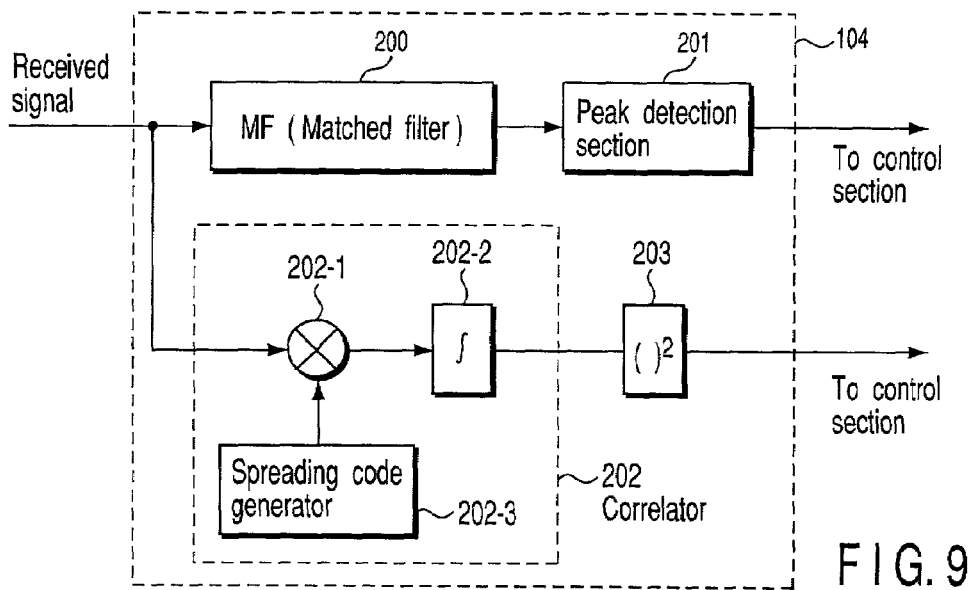
FIG. 9 is a block diagram showing a constitution of the searcher 104 shown in FIG. 7.

FIG. 9 is a block diagram showing a constitution of the above described searcher 104, which is constituted by a matched filter (MF) 200, a peak detection section 201, a correlator 202 and a square multiplier 203. The correlator 202 comprises a multiplier 202-1, an integrator 202-2 and a spreading code generator 202-3.

Figure 10:
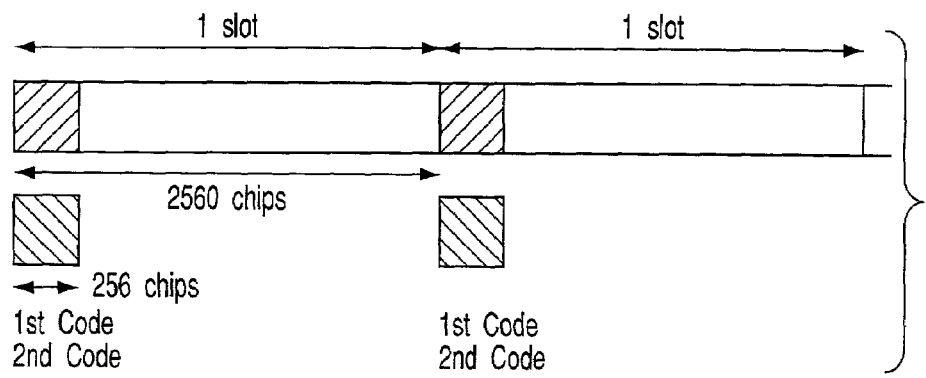
FIG. 10 shows a constitution of a synchronizing signal of a 3GPP system.

FIG. 10 shows a constitution of a synchronizing signal of the 3 GPP system. As shown in FIG. 10, in the 3 CPP system, a first code and a second code for synchronization are transmitted at the head of one slot from the base station. By receiving the first code first by the matched filter (MF) 200, a slot timing is obtained, and by establishing synchronization of the second code next, a group number of the base station and a frame timing are obtained. Next, a mobile station founds the number of the base station by correlation output of a pilot signal.

Figure 11:
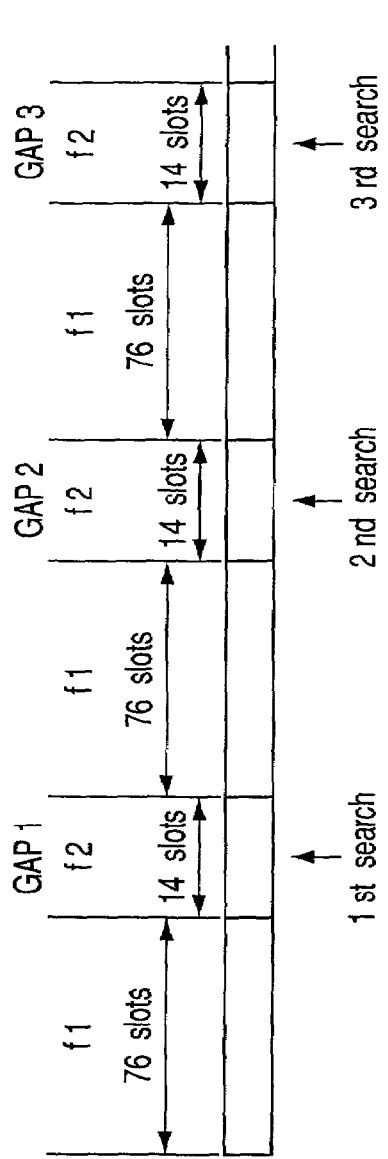
FIG. 11 shows an example in which, after a search at a frequency f1 of a telephone communication base station is performed for 76 slots in the same manner as in FIG. 6, the frequency is changed to f2 and the search for 14 slots is performed.

FIG. 11 shows an example, in which after a search at the frequency f1 of the telephone communication base station is performed for 76 slots in the same manner as in FIG. 7, the frequency is changed to f2 and the search for 14 slots is performed. FIG. 11 is an example, in which a first search is performed by the matched filter 200 at a first GAP 1, a second search is performed by the correlator 202 at a GAP 2, and a third search to identify the code of the base station is performed at a GAP 3.

Figure 12:
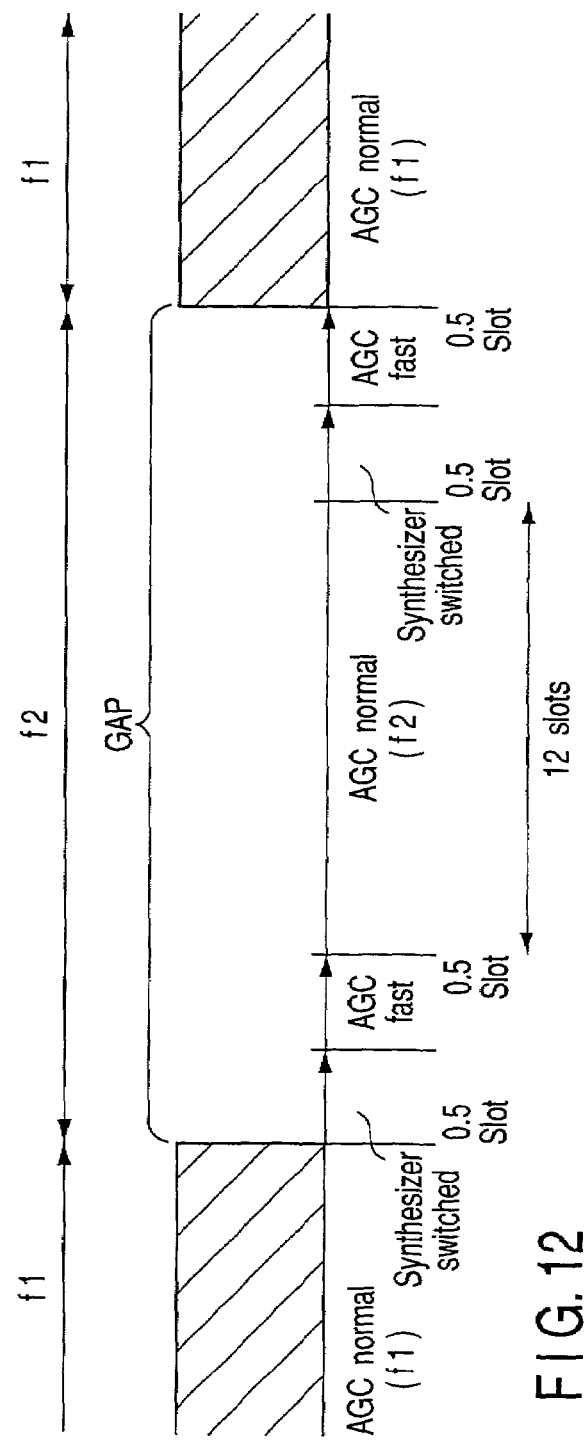
FIG. 12 shows a state of switching a synthesizer and an AGC parameter at a GAP boundary.

FIG. 12 shows a state of switching parameters of the synthesizer and the AGC at the GAP boundary. The normal operation of the AGC is performed in the search of f1, and the synthesizer is switched by about 0.5 slot at the GAP boundary at the compressed mode time, and next, high-speed operation of the AGC is performed by about 0.5 slot. Then, the normal operation of the AGC of 12 slots is performed in the search of f2. After that, the synthesizer is switched by about 0.5 slot, and next, high-speed operation of the AGC is performed by about 0.5 slot, thereby completing the compressed mode to return to the f1 search and perform the normal operation of the AGC.

In the above description, a method of transmitting effectively the BCH information by deciding the GAP position in the compressed mode by taking into consideration two frames constituting one piece of BHC information was described. As a modified embodiment of the present embodiment, however, the information to be eliminated to form the GAP in the compressed mode among the BCH information may be decided based on a degree of importance of the information. Note that the same information may not to be used always for the GAP formation at the compressed mode time.

Figure 13:
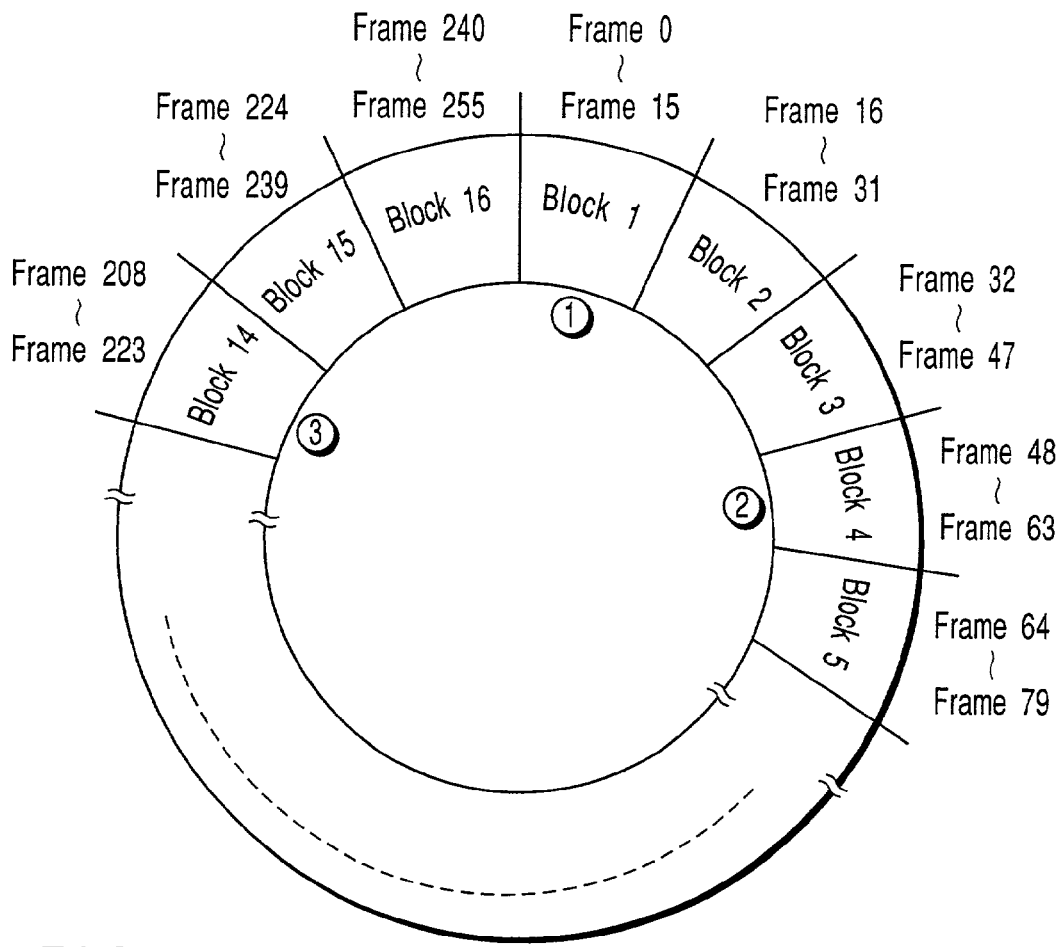
FIG. 13 explains a modified embodiment of the present embodiment.

FIG. 13 explains the present modified embodiment. FIG. 13 shows a constitution in which the BCH information circulates a round by starting from frame 1 and terminating at frame 256. In such a frame constitution circulating a round, conventionally, the GAP is sometimes fixedly set so as to stride over frame 15 to frame 16. When the GAP is decided fixedly at such a position, the information at the boundary portion of blocks 1 and 2 is always dropped out. Accordingly, part of system information is always dropped out due to existence of the GAP of the compressed mode, thereby leading to a serious system error.

In order to avoid such a situation, the present modified embodiment performs such a procedure that, the GAP is formed at the position of block 1 first, and the GAP is next formed at block 4, and when next coming to the position of block 1 after circulating a round, the GAP is not formed.

When, for example, block 5 of FIG. 13 is information block, which does not have any change once the BCH information is obtained, it is possible to turn the information block position into a block where a GAP is always arranged.

According to the above described embodiment, when the GAP position of the compressed mode is arranged, each position is arranged so as not to stride over the boundary by taking into consideration the position of the set of adjacent frames which constitute one piece of the BCH information. Therefore, it is possible to reduce the dropout of the BCH information at the compressed mode time to a minimum.

When the BHC information once obtained is information which is not changed, the GAP position is positively arranged on the position of the information so that the system error due to dropout of the BCH information can be reduced.

When the BHC information once obtained is information which is changed, the GAP is not arranged on the same block so that the system error due to dropout of the BCH information can be reduced.

According to the present invention, there can be provided the radio communication system and the base station which can reduce the dropout of the information to a minimum at the compressed mode time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A Wideband Code Division Multiple Access (W-CDMA) radio communication system in which a plural pieces of BCH (Broadcast Channel) information are transmitted/received between a base station and a mobile station, and each BCH information is constituted by a plurality of frames, wherein the base station comprises:
a transmission/reception section; and
a control section which, during a telephone communication performed between the base station and the mobile station using a first frequency, when an instruction to switch the first frequency to a second frequency is received via the transmission/reception section, decides a time interval for the telephone communication using the second frequency so as not to stride over a boundary of two BCH information blocks adjacent to each other, wherein the time interval is a gap position created in W-CDMA compressed mode.

2. The radio communication system according to claim 1, wherein the each BCH information block comprises SFN (System Frame Number), data, and CRC(Cyclic Redundancy Check) information.

3. The radio communication system according to claim 1, wherein the each BCH information circulates around every time a predetermined number of frames are transmitted, and the time interval for the telephone communication by the second frequency is provided on different frame position every time the BCH information circulates around.

4. The radio communication system according to claim 1, wherein the BCH information corresponding to the time interval for the telephone communication by the second frequency is information which is not changed after obtained once.

5. The radio communication system according to claim 1, wherein the BCH information corresponding to the time interval for the telephone communication by the second frequency is decided according to a degree of importance as system information.

6. A Wideband Code Division Multiple Access (W-CDMA) radio communication system in which a plural pieces of BCH(Broadcast Channel) information are transmitted/received between a base station and a mobile station, and each BCH information is constituted by a plurality of frames,
wherein the base station comprises:
a transmission/reception section,
a control section which, during a telephone communication performed between the base station and the mobile station using a first frequency, when an instruction to switch the first frequency to a second frequency is received via the transmission/reception section, decides a time interval for the telephone communication using the second frequency so as to be placed within each BCH information block, wherein the time interval is a gap position created in W-CDMA compressed mode, and
a transmitting section which transmits a base station signal including information necessary to form the decided time interval to the mobile station; and
wherein the mobile station forms the time interval at a predetermined position of the base station signal which is being received, on the basis of the information transmitted from the transmission section.

7. The radio communication system according to claim 6, wherein each BCH information block comprises SFN (System Frame Number), data, and CRC (Cyclic Redundancy Check) information.

8. The radio communication system according to claim 6, wherein each BCH information circulates around every time a predetermined number of frames are transmitted, and the time interval for the telephone communication by the second frequency is provided on different frame position every time the BCH information circulates around.

9. The radio communication system according to claim 6, wherein the BCH information corresponding to the time interval for the telephone communication by the second frequency is information which is not changed after obtain once.

10. The radio communication system according to claim 6, wherein the BCH information corresponding to the time interval for the telephone communication by the second frequency is decided according to a degree of importance as system information.

11. A Wideband Code Division Multiple Access (W-CDMA) base station in which a plural pieces of BCH (Broadcast Channel) information are transmitted/received between the base station and a mobile station, and each BCH information is constituted by a plurality of frames, comprising:
a control section which, during a telephone communication performed between the base station and the mobile station using a first frequency, when an instruction to switch the first frequency to a second frequency is received via the transmission/reception section, decides a time interval for the telephone communication using the second frequency so as to be placed within each BCH information block, wherein the time interval is a gap position created in W-CDMA compressed mode; and
a transmitting section which transmits information necessary to form the decided time interval to the mobile station.

12. The radio communication system according to claim 11, wherein each BCH information block comprises SFN (System Frame Number), data, and CRC (Cyclic Redundancy Check) information.

13. The radio communication system according to claim 11, wherein each BCH information circulates around every time a predetermined number of frames are transmitted, and the time interval for the telephone communication by the second frequency is provided on different frame position every time the BCH information circulates around.

14. The radio communication system according to claim 11, wherein the BCH information corresponding to the time interval for the telephone communication by the second frequency is information which is not changed after obtain once.

15. The radio communication system according to claim 11, wherein the BCH information corresponding to the time interval for the telephone communication by the second frequency is decided according to a degree of importance as system information.

16. A Wideband Code Division Multiple Access (W-CDMA) radio communication method in which a plural pieces of BCH (Broadcast Channel) information are transmitted/received between a base station and a mobile station, and each BCH information is constituted by a plurality of frames, comprising:
receiving, during a telephone communication performed between the base station and the mobile station using a first frequency, an instruction to switch the first frequency to a second frequency;
deciding a time interval for the telephone communication using the second frequency so as not to stride over a boundary of two BCH information blocks adjacent to each other, wherein the time interval is a gap position created in W-CDMA compressed mode;
transmitting a base station signal including information necessary to form the decided time interval to the mobile station, and forming the time interval at a predetermined position of the base station signal which is being received, on the basis of the information transmitted from the transmission section.

17. The radio communication method according to claim 16, wherein each BCH information block comprises SFN (System Frame Number), data, and CRC (Cyclic Redundancy Check) information.

18. The radio communication method according to claim 16, wherein each BCH information circulates around every time a predetermined number of frames are transmitted, and the time interval for the telephone communication by the second frequency is provided on different frame position every time the BCH information circulates around.

19. The radio communication method according to claim 16, wherein the BCH information corresponding to the time interval for the telephone communication by the second frequency is information which is not changed after obtained once.

20. The radio communication method according to claim 16, wherein the information corresponding to the time interval for the telephone communication by the second frequency is decided according to a degree of importance as system information.

* * * * *